United States Patent Office 3,357,955
Patented Dec. 12, 1967

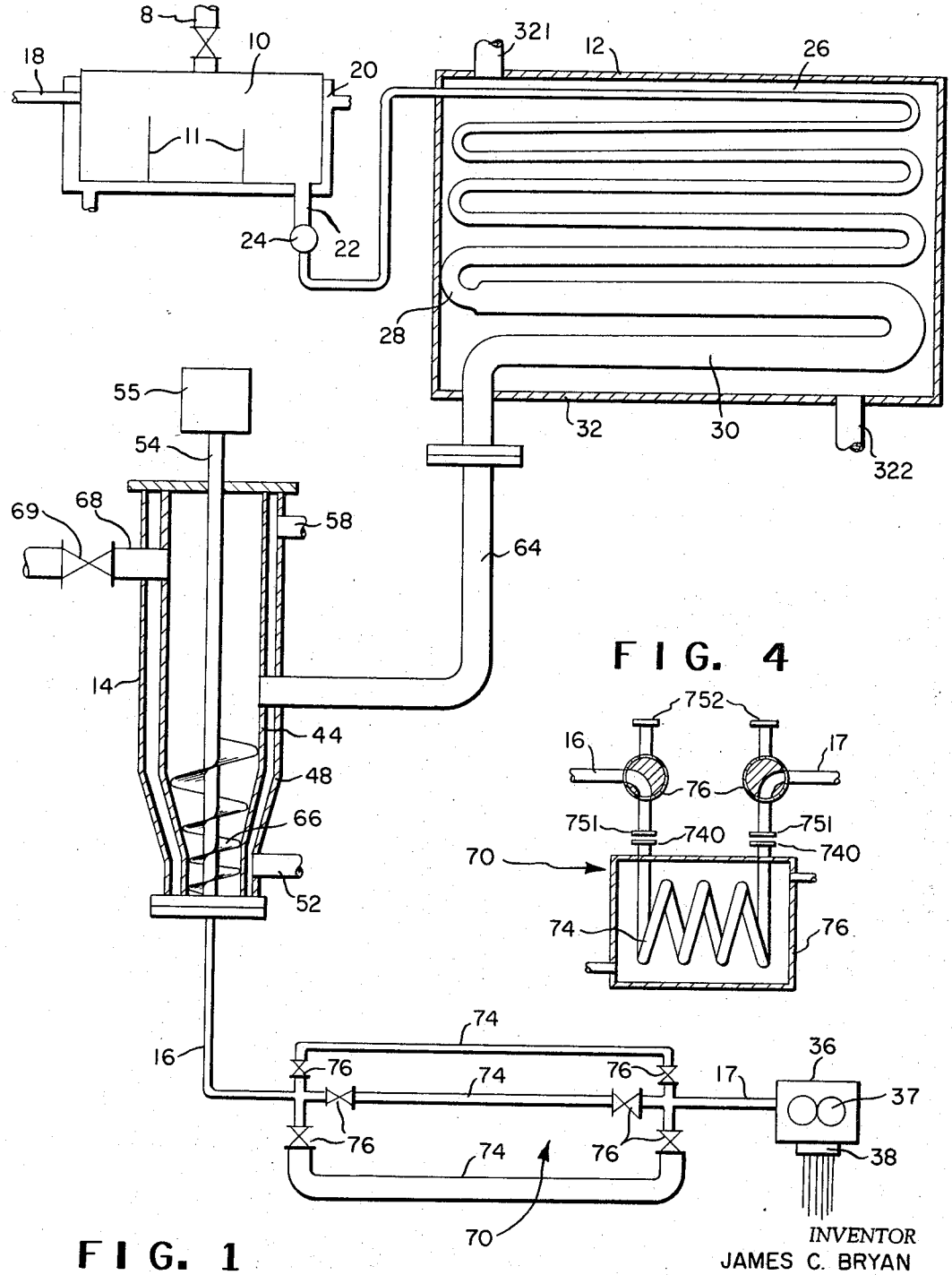

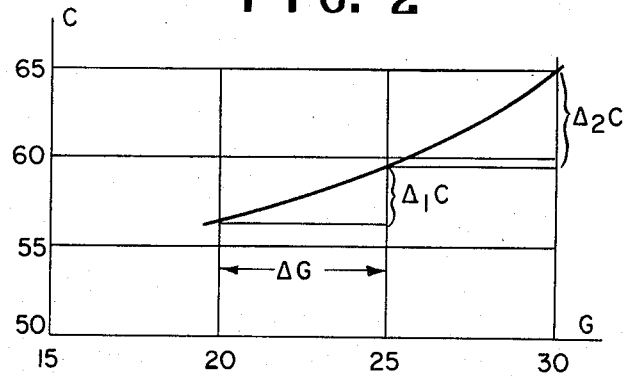
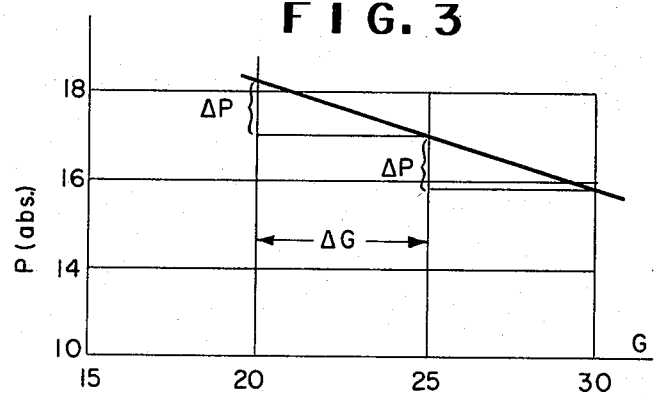

3,357,955
CONTINUOUS PREPARATION OF POLYAMIDES WHEREIN RELATIVE VISCOSITY AND AMINE-END VALUE OF FINAL PRODUCT ARE MAINTAINED CONSTANT
James C. Bryan, Waynesboro, Va., assignor to E. I. du Pont de Nemours and Company, Wilmington, Del., a corporation of Delaware
Filed Feb. 14, 1964, Ser. No. 345,042
2 Claims. (Cl. 260—78)

This invention relates generally to a process for the production of synthetic polymeric materials and more particularly to a process for the preparation of polyamides.

The batch method for making fiber-forming polyamides is disclosed in detail in U.S. Patents 2,071,250, 2,071,253, 2,130,984 and 2,190,770 by W. H. Carothers. These fiber-forming polyamides are linear condensation products and are made by heating bifunctional reactants under polymerizing conditions with continued removal of volatile reaction products until the product obtained is capable of being extruded from the melt into filaments, and these may be further drawn into useful fibers which, on X-ray examination, show orientation along the fiber axis. The fiber-forming polymers, described in the mentioned patents, are made from polyamide-forming reactants. Preferred polyamides are those made from diamines and dicarboxylic acids, such as hexamethylene diamine and adipic acid.

U.S. Patent 2,361,717 to Taylor and U.S. 2,689,839 to Heckert show how polyamides may be made by continuous processes rather than the batch method of Carothers. Taylor discloses continuously passing an aqueous solution of a diamine-dicarboxylic acid salt at superatmospheric pressures and at amide-forming temperatures through a compartmental reactor. The temperature-pressure conditions in the initial compartment are such and the rate of travel of the solution is such that a major portion of the solution is converted to polyamide. The reaction mass is then further subjected to amide-forming temperatures, at pressures permitting formation of steam, to remove water from the reaction composition as steam, until the composition consists essentially of polyamide. Molten polymer is delivered continuously from the exit end of the reaction assembly.

The advantage of the Taylor continuous process described above is that the fiber-forming polyamide may be prepared more economically, uniformly and with less handling than the batch process. However, the continuous process as hitherto practiced has been suited principally to sustained operations at a constant throughput. Throughput control is usually achieved by setting the speed of the gear pump immediately preceding the extrusion head, and making corresponding adjustments in the preceding valves and pumps in the system, whereby to maintain a continuous and uniform flow of the reacting materials through the system.

In practice, production demands often necessitate a change in the denier of the filaments being produced. Changes in denier in their turn are achieved by adjusting the speed of the gear pump, whereby changes in the mass rate of extrusion are achieved. But, as already noted, changes in the gear pump speed automatically affect the value of the throughput (i.e. the quantity of mass passing through the entire apparatus system per unit of time). Changes in throughput, in turn, affect the residence time, i.e., the time spent by the mass in going through the entire apparatus, and consequently also the residence of the mass in any given unit of the apparatus layout. Changes in residence affect the qualities of the product being extruded, particularly, its viscosity and its amine-ends value.

Polymer viscosity may be taken as an index to the degree of polymerization and has a bearing on the behaviour of the polymer in the melt spinning operation and on the tensile properties of the polyamide fibers. The concentration of amine ends in the polymer affects the affinity of the fibers for certain textile dyes.

It follows, therefore, that when changes in throughput of a continuous polymerization system are attempted to satisfy production requirements, problems arise in maintaining constancy of polymer properties.

The phrase "amine end concentration" refers to the number of reactive amine groups which are terminal groups on the long-chain polyamide molecules and is usually expressed as gram-equivalents per million grams of polymer. The preferred method of amine end analysis employs conductometric titration with hydrochloric acid of a solution of the polyamide in a phenol-alcohol mixture, and is described in detail by J. E. Waltz and J. B. Taylor in Analytical Chemistry, vol. 19, page 448 (July 1947).

It is, accordingly, an object of this invention to provide a means of controlling the operation of a continuous polymerization system which is subject to varying throughput rates, whereby to produce a continuous stream of molten polyamide having constant relative viscosity and constant amine end concentration.

Another object is to provide means for obtaining fiber-forming polyamide of desired predetermined properties in a continuous polymerization system. Other objects and achievements will become apparent from the disclosure, the drawing and the claims.

We have found that the objects of this invention are best accomplished, firstly, by adjustment of the concentration of the aqueous polyamide-forming solution being fed into the continuous polymerization system, and secondly, by further adjustment of the pressure at which the final quantities of steam are released from the molten polyamide. Thus, to maintain constancy of polymer viscosity and amine end concentration as the rate of throughput from the system is increased, solution concentration is increased and steam vapor pressure in the final separator is decreased. The procedure is reversed when the throughput rate is decreased. The solution concentration, usually 50 to 70 weight percent, has a predominant effect on polymer amine ends. Steam vapor pressure, nominally operated from partial vacuum to 10 p.s.i.g, has a major effect on relative viscosity.

The above two adjustments must be correlated so as not to offset one another. Furthermore, it is necessary to maintain temperature and other operating conditions constant. Consequently, this invention includes, as a third essential feature, the provision of an equilibrating, constant temperature zone, which serves to transfer the molten polymer from the final water separator to the zone of extrusion while holding it up for a fixed, predetermined period whose value is not allowed to change when the overall rate of throughput is varied.

To make the matter clearer, reference is now made to the accompanying drawing, in which FIGURE 1 illustrates schematically an arrangement of apparatus which utilizes the principles of the invention.

FIGS. 2 and 3 are graphs, based on experimental data and showing the changes required, according to this invention, in initial salt concentration (C) and separator steam pressure (P) to offset variations made in the throughput value (G).

FIG. 4 is a diagrammatic view of a modified form of the equilibrating unit 70, which forms part of the general apparatus shown in FIG. 1.

Referring now to FIG. 1, the continuous polymerization system includes a first reactor 10 in which an aqueous polyamide-forming composition is partially polymerized at amidation pressures and temperatures; and a second reactor 12 wherein polymerization continues at amidation temperatures with a reduction in pressure; a steam-polymer separator 14 and a transfer system including pipe 16 and equilibration unit 70 for transferring the polymer from the separator to spinning head 36.

This system is similar to that disclosed in Taylor except for the replacement of a finishing conveyor by the steam-polymer separator 14, and for the addition of equilibration unit 70.

Concentration of the aqueous polyamide-forming salt solution fed to the system is adjusted by controlling the evaporation of an initial feed solution of less than 50 weight percent to the desired concentration in a conventional evaporator, not shown in the drawing.

The reactor 10 is a horizontal cylindrical vessel partitioned at 11 so that the reaction mass progresses through compartments without backmixing as it travels from the inlet to discharge end. The amide-forming salt solution from the evaporator is admitted through inlet pipe 18 and heated by introduction of hot vapor to jacket 20. Such heating vaporizes water of solution and initiates polymerization reaction. The steam vapor is allowed to escape through pipe 8. Partially polymerized material is withdrawn from reactor 10 through outlet pipe 22 and forced by pump 24 into the second reactor or flasher 12.

As illustrated, the second reactor 12, hereafter referred to as the flasher to distinguish it from the first reactor, includes three sections 26, 28, 30 of tubing which are connected in series and of successively increasing diameter. The tubes 26 to 30 are surrounded by a heating jacket 32, which receives heating fluid at 321 and discharges it at 322. From the tube 30, the reaction products are passed to steam separator 14.

The steam separator 14 comprises a vertical tubular column 44 with a conduit 64 for entry of reaction products from flasher 12, a pipe 68 and valve 69 for exhausting steam which is disengaged from the molten polymer, and a screw 66 driven by shaft 54 and motor 55. The screw device 66 is designed to equalize the holding time of all portions of the polymer melt within this vessel, to squeeze steam bubbles out of the melt and to deliver bubble-free melt to the equilibration system 70. The separator is surrounded by heating jacket 48 which is supplied with a suitable heat transfer medium through pipe 52.

Turning now to the equilibration system 70 which is believed to be a novel element in the continuous polymerization of polyamides, polymer is conveyed through a jacketed transfer system of pipes 16, 74 and 17 to the point of use for the melt. This pipe system allows sufficient time for the moving polymer stream to come to chemical equilibrium with any residual water content therein, while still avoiding thermal degradation.

The system 70 in FIG. 1 is an illustrative embodiment and comprises a manifold arrangement of valves 76 and equilibration tubes 74. These tubes are sized to provide a predetermined constant total residence time (usually, in the range of 10 to 45 minutes) by compensating in volume for any change in throughput value. For instance, let us assume that at a given throughput, the polymer stream flows through the tube of a particular size. When the throughput is changed, the flow of polymer is directed through the manifold valve arrangement to a different, properly selected equilibration tube, to maintain a constant residence time in the equilibration unit; feed concentration to the reactor 10 and vapor pressure in the steam separator 14 are also appropriately adjusted to maintain constancy of polymer qualities, as described in the disclosure which follows.

In FIG. 1, the polymer is shown as delivered to a conventional melt spinning head at 36, which includes a gear pump 37, by the aid of which the melt is extruded into fiber through spinneret 38. If desired, a finisher conveyor of the type disclosed by Taylor may be installed at this point for additional aftertreatment of polymer, or the polymer may be cast directly into bars, sheets, or chips.

Under steady state conditions in actual practice, an aqueous solution of diamine-dicarboxylic acid salt of a fixed concentration (in the range of 50 to 70% by weight) is fed to an evaporator at a constant rate. The solution is brought to amidation temperatures and pressures, approximately 240° C. and 250 p.s.i., in the first reactor 10. As the reaction mass progresses through the continuous polymerization system, water vapor is removed, and heating is continued until the resulting polyamide has good fiber-forming properties. In the release of steam from the reaction, it is possible also for other volatile materials, such as unreacted diamine, to escape and thereby alter the molecular balance of diamine and dicarboxylic acid. The initial composition of the reaction mixture, the conditions of temperature and pressure in the separator, and the temperature and residence time in the equilibration unit are all factors which influence the amine end concentration and the relative viscosity of the polyamide from this system.

Considering now the control of amine end concentration with varying polymer throughput, various methods have been known prior to this invention. The use of excess diamine or dicarboxylic acid initially in the salt solution to control the concentration of the end groups in the final polymer was disclosed by Carothers, but this requires additional handling and metering facilities. Injection of diamine or dicarboxylic acid solution into the flasher is a more positive alternative, but it also entails elaborate and costly equipment. Control of the temperature of the feed of the reactant mixture or the rate of heating in the reactor of the continuous polymerization system may be used to regulate the diamine loss, which, in its turn, determines the concentration of amine ends in the polymer. The practical application of this principle, however, is complicated.

Now, according to this invention the concentration of amine ends in the product is kept constant under varying throughputs by simply varying the concentration of the initial salt solution fed into the reactor. To my knowledge, the use of salt concentration as a means of control of amine ends in the final product is a departure from established practice.

Considering next control of relative viscosity in a continuous polymerizer, it has already been mentioned that changes in throughput rate will cause changes in polymer viscosity. This is true because total equipment volume available for reaction is constant and a change in production rate therefore will change reaction time available.

In the practice hitherto, polymer viscosity has commonly been controlled by adjustment of the amount of stabilizer, usually a monofunctional acid, which seals off reactive polymer end groups and thereby limits the attainable molecular weight. This method may be used to control the total number of reactive end groups at a predetermined level, but the amine end concentration would also vary, up or down, as an inverse function of the stabilizer content. Therefore this method is unsatisfactory for the production of polymer in which it is necessary to maintain the same number of amine ends as well as the same relative viscosity.

Other methods of controlling relative viscosity have also been known. For example, time may be kept approximately constant with changing throughput by varying the level in the separator to adjust residence time. This method however offers opportunity for contamination of the polymer by degradation on the vessel walls. Relative viscosity may also be controlled to some extent by adjustment of the reaction temperature with consequent change in reaction rates and equilibrium constant. This method is limited by the time lag for heat transfer within the system.

In accordance with our present invention, the above difficulties are overcome by using polymer moisture content as a means of relative viscosity control.

In the continuous polymerization system, unstabilized polymer is discharged from the flasher into the separator where the steam liberated in the flasher is disengaged. The polymer discharged from the separator is normally not in a state of chemical equilibrium, that is, the free moisture content is below the equilibrium free moisture content at the attained relative viscosity and temperature. But in the instant invention, this unequilibrated polymer is pumped into a closed pipe line (the equilibration unit) and allowed to come to chemical equilibrium prior to extrusion of the melt into fibers. The equilibrium viscosity which is attained in this closed system is determined by the total moisture, free and combined, present in the polymer. If this total moisture content is maintained constant for all throughputs and equilibration time is maintained constant, the product of all throughputs will have the same relative viscosity. This is accomplished by controlling the vapor pressure in the separator which, in turn, controls the amount of free water dissolved in the polymer. At a low throughput rate, for example, the reaction time in the system would be relatively high with a low combined moisture content in the polymer leaving the separator and as a consequence the relative viscosity would be high. In this case, the separator vapor pressure would be maintained at a relatively high level, resulting in high free moisture content. Hence, by adjustment of the separator vapor pressure in relation to the throughput rate, it is possible to control the moisture content of the polymer at a constant level, as the latter leaves the separator and enters the transfer system 16–70 whereby to attain a constant level of viscosity after equilibration in said system.

An incidental benefit of controlling viscosity by moisture rather than with monobasic acid stabilizer is that the level of amine ends is higher as none are blocked off by the acid. This gives product of greater affinity for certain textile dyes.

The invention is illustrated but not limited by the following example for polymerization of hexamethylene diamine adipamide:

A series of polymerizations were performed in a continuous polymerization system similar to that shown in FIG. 1 of the drawing.

In Test Run I, the gear pump 36 and the supply of material to reactor 10 were adjusted in unison to give a constant throughput of 25 lbs./hr. The aqueous solution of hexamethylene diamine-adipic acid salt, serving as initial material, was evaporated to 59.5% salt concentration (by weight) and fed to reactor 10 through pipe 18. The pressure in steam separator 14 was adjusted to and maintained at 1.45 p.s.i.g., and the reaction mass issuing from the separator was held in the equilibrating system 70 for a period of 30 minutes. The total dwell of the mass in the apparatus layout from point of entry into reactor 10 to the point of contact with the gears of pump 36 was 242 minutes. The resulting polymer had a relative viscosity of 38 and an amine-end value of 48 (gm. equiv./$10^6$ gm. of polymer).

*Test Run II.*—The gear pump and supply were readjusted in unison to give a throughput of 20 lbs./hr. Following a previously established experimental chart, the concentration of the salt being fed to the reactor was decreased to 56.5% by weight. The separator pressure was increased to 3.15 p.s.i.g., but the equilibration time was maintained at 30 minutes (as in Test Run I) by replacing the pipe in system 70 by one of equal length, but of 20% smaller cross-sectional area. The resulting polymer had a relative viscosity of 38 and an amine-ends value of 49.

*Test Run III.*—The gear pump and supply were again re-adjusted, to give a throughput of 30 lbs./hr. The concentration of the initial salt was adjusted to 65% by weight, and the separator pressure was reduced to atmospheric. By substituting now in system 70 a pipe of same length as in Run I but 20% larger in cross-sectional area, the equilibration time was maintained at its previous value of 30 minutes. The resulting polymer had a relative viscosity of 38 and an amine-end value of 49.

The essential data of the aforegoing three test runs are summarized, for easy comparison, in the following table.

| Test Run | I | II | III |
|---|---|---|---|
| Polymer throughput, lb. per hr | 25 | 20 | 30 |
| Salt concentration fed to reactor, weight percent | 59.5 | 56.5 | 65 |
| Separator pressure, p.s.i.g. | 1.45 | 3.15 | 0 |
| Polymer properties: | | | |
| Amine-ends value | 48 | 49 | 49 |
| Relative viscosity | 38 | 38 | 38 |

The polymers obtained in the above three test runs were spun into yarn directly during the experiments. Fabrics produced from the yarns were dyed with an acid dye which is highly sensitive to amine end concentration. The shade of the fabrics from these three yarns was essentially the same, confirming the above observed essential equality in amine end levels.

It will be understood that the above test runs do not limit this invention, and that variations in throughput of wider range can still be compensated by the method of this invention, which, as has already been explained, comprises three essential features, namely:

(1) Adjustment of initial salt concentration. (Decreasing same with decreased throughput, and the reverse.)
(2) Adjustment of pressure in steam separator. (Increasing the pressure for decreased throughput, and vice versa.)
(3) Provision of an equilibration zone and maintenance of the mass in said zone at a constant residence time for all throughput variations.

It will be noted further that factor 1 above is so potent that a relatively small change in salt concentration (as from 59.5 to 56.5) compensates for a relatively large change in throughput (from 25 to 20). Factor 2 on the other hand represents an essentially linear and decreasing relation between the required pressure and the value of the throughput. Thus, the results of the above three test runs may be summarized by the following equations:

For Factor 1:

$$\Delta C = a(G-b)\Delta G$$

wherein $G$ is the average of the initial throughput rate plus the current value of the throughput rate (in lbs./hr.);
$\Delta G$ is the contemplated change in throughput (in lbs./hr.);
$\Delta C$ is the required change in salt concentration (in percent by weight);
$a \doteq 0.12$, and $b = 17.5$ in the instant case, but may have other values in other apparatus set-ups.

For Factor 2:

$$\Delta P = -K \Delta G$$

where $\Delta P$ is the change in separator pressure (in lbs. per sq. in.) required by a change $\Delta G$ (in lbs./hr.) in the throughput; in this particular case, $K \doteq -0.31$.

Graphical representation of the above equations for these two factors are given in FIGS. 2 and 3, respectively.

From such equations, it is possible to compute the values of the salt concentration and steam vapor pressure which are required at an assigned throughput rate to maintain the desired amine-end concentration and relative viscosity constant, assuming a constant equilibration time.

It is clear that this invention makes it possible to extend the utility of continuous polymerization systems, which are otherwise best suited only to operation under steady state conditions and at a constant rate of throughput.

Moreover, it is possible to arrange the procedure according to this invention so as to minimize or essentially eliminate any variations in the qualities of the product due to the effect of the transition period. To illustrate what I mean, let us suppose that at a given hour, which we shall designate as the zero hour, a change is made in the setting of the gear pump whereby to increase the throughput. The residence time will then start dropping but will not reach its final value until the change has had time to travel back through the apparatus layout from the gear pump to line 18, which feeds salt solution to reactor 10. This period may be substantial compared to the total residence of the materials in the apparatus layout.

If a compensating change in the concentration of the aqueous salt solution were made at zero hour or immediately thereafter, the effect of this change would travel forward with the materials and reach the gear pump after a considerable time delay, which may be again appreciable compared to the total residence time. It is clear then that in the interval between zero hour and the end of the last mentioned time delay, an uncompensated decrease in residence time will exist, which will exert its effect on the viscosity and amine-ends value of the product.

Accordingly, it is better to make the change in salt concentration in advance, anticipating the change in the setting of pump 36 by a period which is, for best results, determined experimentally. The experiments found most useful for the purposes of this invention would determine first how long it takes a change in initial salt concentration to show a detectable effect (in the form of a changed amine-ends value) at the inlet to steam separator 14.

A second set of experiments would determine how long it takes for a given change in throughput at the gear pump to travel back and show a detectable effect (in terms of changed viscosity) at that same point of reaction mass inlet into the steam separator 14.

A third set of experiments would determine the length of the residence time of the reaction mass (on the average) in the steam separator.

From the data obtained in these three sets of experiments, a sequence and time-table can be readily worked out for the four change operations required (i.e. changing the salt concentration; changing the pump velocity; changing the steam pressure and selection of proper conduit in the equilibrium unit), whereby to make the polymer flowing through the pump maintain its primary qualities (amine-ends and viscosity) at essentially the same levels throughout the switchover operation.

It will be noted that the two control variables involved in the process of this invention, namely, concentration (C) of salt feed to the reactor and vapor pressure (P) in the separator, may each have some effect on both relative viscosity and amine ends, although the major effect of salt concentration is on amine end level and the major effect of separator pressure is on relative viscosity. Accordingly, it is to be understood that our invention is not limited to any precise theory in this respect, particularly since the parameters $a$, $b$ and $K$ in the above equations for $\Delta C$ and $\Delta P$ are to be determined experimentally for any particular type of apparatus layout.

In FIG. 4 an alternative form of equilibrating unit 70 is shown. Each of pipes 16 and 17 is forked through a valve 76 into two branches, which terminate in coupling flanges 751 and 752. Either pair of these terminal flanges (751 in the situation shown in FIG. 4) may be connected, through corresponding flanges 740 to the ends of a transfer conduit 74 which is contained in a heating jacket 76. Valves 76 are, of course, turned so as to send molten polymer through conduit 74, while shutting off the other pair of branches of pipes 16 and 17.

When it is desired to change the speed of pump 37, a jacketed pipe system 74, 76 of similar construction but of different internal pipe volume is connected across terminal flanges 752, and valves 76 are turned so as to switch in the new unit into the flow circuit and to disconnect the old one. The latter may then be removed, washed and stored for future use.

Other variations in the structure of the equilibrating system will be readily apparent to those skilled in the art.

The term "relative viscosity" as used in this specification is the ratio of absolute viscosity at 25° C. (in centipoises) of the solution of synthetic linear polyamide in 90% formic acid (10% water and 90% formic acid) to the absolute viscosity at 25° C. (in centipoises) of the 90% formic acid. An 8.4% (by weight) solution of the synthetic linear polyamides which are completely soluble in 90% formic acid is used in this determination. Moisture content of polyamides is disregarded in preparation of the polyamide-formic acid test solutions if it is lower than 0.4%.

I claim as my invention:

1. In a continuous system of polymerization wherein (1) a polymer is produced by continuous polymerization of an initial aqueous solution of a salt of a diamine and a dicarboxylic acid; (2) final quantities of water are separated from the resultant polymer under pressure; and (3) the polymer is transferred from the point of final water separation to a zone of extrusion while holding it up for a fixed, predetermined time interval under constant temperature, a process for maintaining the relative viscosity and the amine-end value of the final product constant during an increase in throughput rate by:
    (1) increasing the salt concentration in the aforesaid initial aqueous solution within the range of about 50 to 70 weight percent;
    (2) decreasing the steam pressure under which the final quantities of water are separated from the polymerized product within the range of about 0 to 10 p.s.i.g.; and
    (3) holding the temperature and the time interval for the transfer of polymer from the point of last water separation to the point of extrusion constant.

2. In a continuous system of polymerization wherein (1) a polymer is produced by continuous polymerization of an initial aqueous solution of a salt of a diamine and a dicarboxylic acid; final quantities of water are separated from the resultant polymer under pressure; and (3) the polymer is transferred from the point of final water separation to a zone of extrusion while holding it up for a fixed, predetermined time interval under constant temperature, a process for maintaining the relative viscosity and amine-end value of the final product constant during a decrease in throughput rate by:
    (1) decreasing the salt concentration in the aforesaid initial aqueous solution within the range of about 50 to 70 weight percent;
    (2) increasing the steam pressure under which the final quantities of water are separated from the polymerized product within the range of about 0 to 10 p.s.i.g.; and
    (3) holding the temperature and the time interval for the transfer of polymer from the point of last water separation to the point of extrusion constant.

References Cited

UNITED STATES PATENTS

| | | | |
|---|---|---|---|
| 2,361,717 | 10/1944 | Taylor | 260—78 |
| 2,689,839 | 9/1954 | Heckert | 260—78 |
| 3,193,535 | 7/1965 | Carter | 260—78 |

WILLIAM H. SHORT, *Primary Examiner.*

H. D. ANDERSON, *Assistant Examiner.*